United States Patent [19]

Walters

[11] 4,298,022
[45] Nov. 3, 1981

[54] ENERGY SAVER CONTROL FOR OUTDOOR WATER HEATER

[76] Inventor: William R. Walters, 910 W. Caddo, Cleveland, Okla. 74020

[21] Appl. No.: 128,466

[22] Filed: Mar. 10, 1980

[51] Int. Cl.³ .............................................. A01K 7/04
[52] U.S. Cl. ..................................... 137/341; 119/73; 137/59; 137/436; 219/332; 219/333; 219/496
[58] Field of Search ................... 119/73; 137/59, 341, 137/436; 219/332, 333, 496

[56] References Cited

U.S. PATENT DOCUMENTS

| | | | |
|---|---|---|---|
| 2,297,030 | 9/1942 | Snyder | 219/332 X |
| 2,480,053 | 8/1949 | Schubert | 119/73 X |
| 2,511,721 | 6/1950 | Langenbahn | 219/333 X |
| 2,570,694 | 10/1951 | Langenbahn | 119/73 X |
| 3,636,312 | 1/1972 | Dreher et al. | 219/333 X |

Primary Examiner—Gerald A. Michalsky
Attorney, Agent, or Firm—Head & Johnson

[57] ABSTRACT

An energy saver control system for prevention of water freezing in an outdoor tank, such as a stock tank, which involves a conventional type of water level control valve to maintain a selected level of water in the tank, and an electrical switch which is controlled by the pressure which is in the water line leading to the water level control valve. Means are provided to control the rate of water flow into the tank to a selected low value, sufficient for prevention of freezing of the surface of the water in the tank. When water is flowing into the tank the electrical heater is cut off. The electrical switch is controlled by the pressure in the water line leading to the water level control means.

3 Claims, 3 Drawing Figures

ENERGY SAVER CONTROL FOR OUTDOOR WATER HEATER

BACKGROUND OF THE INVENTION

1. Field of the Invention

This invention lies in the field of outdoor water heaters, such as apparatus for heating stock tanks, to prevent the water from freezing, so that cattle can always have a free water surface for drinking.

2. Description of the Prior Art

In the prior art, electrical stock tank heaters are generally connected to the power line continuously, since the stock tanks are unattended. However, I have found that when water is running into the tank, there is sufficient turbulence of the surface so that the water will not freeze. Therefore, during that period, the electrical heater can be cut off, with a consequent saving in electrical power.

SUMMARY OF THE INVENTION

It is a primary object of this invention to provide a control means for an outdoor water heater system, such as one for heating stock tanks, to prevent freezing of the surface of the water.

It is a further object of this invention to provide a means of controlling the electrical power to the heater such that whenever water is being run into the tank, to bring it up to a selected level, the electrical power is cut off, and whenever the water level is at the selected value and the water level control valve is closed, the power is again connected to the electrical heater.

These and other objects are realized and the limitations of the prior art are overcome in this invention, by providing a conventional water tank, such as a stock tank, and an electrical heating apparatus which may be conventional in all respects.

Pressurized water is brought to the tank by means of an underground pipe, and electrical power is brought to the tank for application to the water heater. A conventional type of water level control means, which may, for example be a float type control valve, is provided for maintaining the level of water in the tank to a selected value. In the customary manner, whenever the water level is reduced, such as by evaporation, or withdrawal of water for any purpose, or is reduced by the consumption of water by cattle drinking from the tank, etc., the level again is brought to the selected value by opening the water level control valve operated by the float arm. This permits water to run into the tank until its level is again at the selected value, at which time the water level control valve will close.

Means are provided, such as by a control valve or an orifice, preferably separate from the shut off valve for the water system, to control the rate of flow of water to and through the level control valve, to a selected small value.

I have found that even a low rate of flow of water into the tank, provides a water surface that is rippled or turbulent, while the water is running into the tank. Under this condition, of the surface of the water is prevented. Consequently, during this period, when the inflow of the water serves to prevent freezing, the electrical power can be cut off. Then after the surface is raised to the selected value, and the level control valve is closed, the electrical power is again connected to the heater.

To maintain this reduced rate of flow to the selected value, I prefer to use a fine control valve such as a needle valve, for example, or an orifice of a selected opening, so that whenever the level control valve is open the water runs through at a pre-selected rate of flow.

BRIEF DESCRIPTION OF THE DRAWINGS

These and other objects and advantages of this invention and the better understanding of the principles and details of the invention will be evident from the following description taken in conjunction with the appended drawings in which.

DETAILED DESCRIPTION OF THE PREFERRED EMBODIMENT

Figure 1:
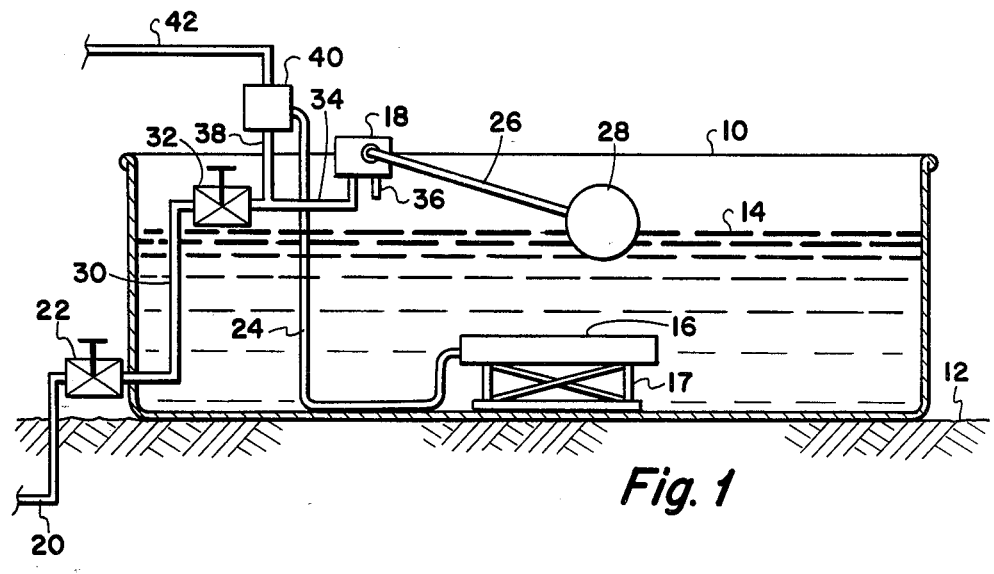
FIG. 1 is a schematic diagram illustrative of one embodiment of this invention.

Referring now to the drawings and in particularly to FIG. 1 there is shown one embodiment of this invention in schematic form. While the invention will be described in terms of a stock tank heater, which is a common and conventional piece of farm equipment it can, of course, be applied to many other types of water tanks which are maintained in the outdoors, and need some means of prevention of freezing of the water surface during cold weather.

The stock tank is indicated by the numeral 10 and rests on the surface 12, of the ground, in the conventional manner. Water is supplied to the tank by means of an underground pipe 20 which leads into the tank through a shut off valve 22. Inside the tank is a riser pipe 30 which goes to a fine control valve 32, and through pipe 34 which will be called the "water line", to a liquid level control means, indicated by the numeral 18. This can be any conventional type of equipment and may, for example, be a float type control valve, which utilizes a float 28 on a float arm 26 hinged at the control means 18, in such a manner as to close a water valve in the housing 18 when the level of the water in the tank reaches a selected value 14. When the water level is less than the selected value 14, the float will drop and the valve in the water level control means 18 will open, thus permitting water to run from the water line 34 through the control valve operated by the float rod 26, and out through an outlet pipe 36 to flow into the tank, and to raise the level of the water to the selected value 14.

I have determined that a relatively small rate of flow of water into the tank through the outlet pipe 36 will maintain agitation of the water surface 14, such that while the water is flowing into the tank there will be no freezing of the surface of the water. Consequently, during that period, the power can be cut off from the electrical heater 16, which is of a conventional immersion type, and is positioned inside of the tank immersed in the water. While the electrical heater is shown as an immersion heater, it can of course be of any type mounted inside or outside of the tank.

Connected to the water line 34 is a branch line 38 which goes to a pressure switch 40. This can be of a conventional type, in which a pair of contacts are closed when sufficient hydraulic pressure is provided in the pipe 38 due to the water pressure in the water line 34. When the water pressure in line 34 is higher than a selected value, the pressure switch 40 will close, and electrical power from the line 42 will go by means of cable 24 from the pressure switch 40 to the electrical heater 16. When the pressure in the water line 34 is less than a selected value, the pressure switch 40 will open, and cut off the electrical power to the heater.

It will be understood that when there is flow of water through the water line 34 from the control valve 32 and through the water level control means 18, and out of the outlet pipe 36, the pressure in the water line 34 will be quite low, and in any case lower than the lower limit below which the switch contacts will open in the pressure switch 40. Thus while the water is flowing through the water level control means 18, there is no power on the heater. Conversely when the level reaches its selected value 14 in the tank, and the control means 18 closes off the flow of water to the outlet pipe 36 the pressure in the water line 34 will rise to substantially the value in the water supply pipe 20. This value will be higher than the value at which the switch contacts will close and reapply power to the heater.

Since this control system of this invention reduces the power requirements for the outdoor water tank heater by cutting off the electrical power while water is flowing into the tank, it will be clear that the rate of water flow through the water line 34, the flow control means 18 and the outlet pipe 36, should not be at any high rate than would be sufficient to provide the necessary turbulence on the water surface to prevent formation of ice. Consequently, the control valve 32 is utilized to provide a fine control of the rate of flow of water to a selected value which has been determined as the value which will maintain an ice free surface. The water flow rate need not be greater than this value.

Figure 2:
FIG. 2 illustrates two means for controlling the rate of flow of water into the tank.

The fine control valve 32 can, of course be a needle valve, such as shown in FIG. 2A. Alternatively, an orifice 32A of a selected opening, such as shown in FIG. 2B could be inserted in the water line between pipes 30 and 34. In fact, the orifice may have an advantage over the control valve, in that it is unchanging, and will always provide the required rate of flow.

Figure 3:
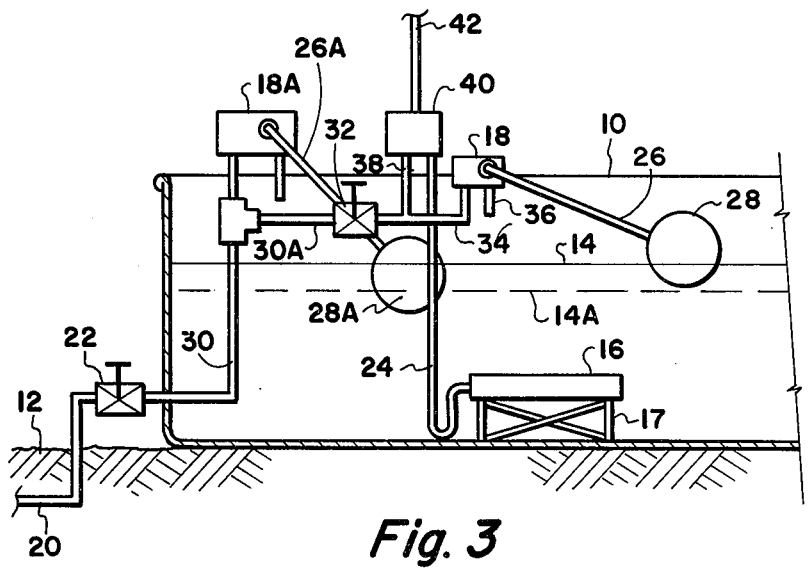
FIG. 3 indicates how the control system of this invention can be installed on a water tank which already has a conventional water level control means.

Referring now to FIG. 3, there is shown a similar water tank system which already has a level control means 18A which can be of any type such as the float control means, utilizing the float 28A and float arm 26A. All that is required to install the apparatus of this invention is to add a TEE 44 in the riser 30, supplying the level control means 18A. The branch line of the TEE 44 goes to line 30A and flow rate control means 32 as in FIG. 1. Beyond that point, the apparatus is identical to that of FIG. 1.

It is necessary, in order to get control by the control means 18, to set the level 14 somewhat higher than the level 14A which was the prior level controlled by the control means 18A. Thus, in order to keep the water level at the desired level 14 the valve 18 would provide the necessary water flow.

What has been described is a simplified control system which utilizes a flow rate control in the water line, and a water level control means of conventional type, in combination with a pressure switch connected to the water line, by means of which the electrical heater can be cut off from the power line during such times as water is flowing into the tank, at a selected low value of flow rate.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim, or claims, including the full range of equivalency to which each element thereof is entitled.

What is claimed is:

1. In an outdoor water heater system, comprising;
   (a) an open tank, a pressurized source of water to fill said tank to a selected level, and a conventional type water level control means to maintain said selected level;
   (b) a source of electrical power and electric heater means for applying heat to the water in said tank to keep said water from freezing;
   the improvement in energy saving means to control said electric heater means, comprising;
   (c) water flow rate control means inserted between said water source and said water level control means, for reducing the rate of flow of water into said tank to a selected value when said water level control means is open;
   (d) water pressure controlled electrical switch means connected in the water line between said water flow rate control means and said water level control means; said switch means adapted to apply electrical power to said heater means when the water pressure on said switch from said water line is above a selected first high value, and to cut off said electrical power to said heater means when the water pressure on said switch from said water line is less than a second low value;
   whereby when said water level in said tank is less than said selected level, and said water level control means is open, water will flow into said tank at said selected flow rate, the pressure in said water line is low, and electrical power is cut off from said heater means; and when said water level is high, and said water level control means is closed, the pressure on said switch is high, and electrical power is applied to said heater means.

2. The system as in claim 1 in which said water flow rate control means is a valve.

3. The system as in claim 1 in which said water flow rate control means is an orifice of selected size.

* * * * *